A. F. SULZER.
PHOTOGRAPHIC FILM CARTRIDGE.
APPLICATION FILED MAR. 23, 1916.
1,195,747.
Patented Aug. 22, 1916.
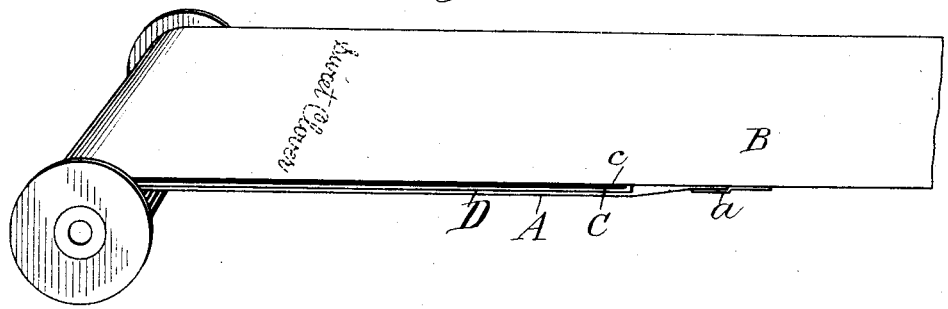
WITNESSES:
Walter B. Payne
Nelson H. Copp
INVENTOR
Albert F. Sulzer
BY
his ATTORNEYS

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

1,195,747.  Specification of Letters Patent. Patented Aug. 22, 1916.

Application filed March 23, 1916. Serial No. 86,156.

*To all whom it may concern:*

Be it known that I, ALBERT F. SULZER, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-numerals marked thereon.

My present invention relates to photography and more particularly to photographic film cartridges for use in cameras of the type in which provision is made for designating the different exposure sections of the contained film by light printing written characters thereon.

The invention has for its object to provide a film cartridge comprising a film strip and an overlying printing strip that receives the writing to be photographed on the film in which cartridge the film strip will be protected from possible deleterious effects that the covering strip, I have found, is apt to have upon it.

To these and other ends the invention resides in certain improvements and combinations of parts all as will be hereinafter more fully described, the novel features being pointed out in the claims at the end of the specification.

In the drawings: Figure 1 is a perspective view of a film cartridge or spool constructed in accordance with and illustrating one embodiment of my invention, the film and its wrappings being shown partly unwound, and Fig. 2 is an enlarged side elevation of a portion of the film and its wrappings.

Similar reference numerals throughout the several views indicate the same parts.

My invention relates particularly to the so-called cartridges of photographic film comprising an outer translucent backing for the transparent film or support carrying the photographically sensitized surface, between which and the film is positioned a sheet having a coating that prevents the passage of actinic light to the film but may be rendered light permeable when pressure is applied thereto as by writing against it with a suitable stylus or pencil.

The invention lies in the provision of means for preventing the coated sheet from adhering to the film due to the absorption of moisture, and particularly when the parts are wet by the developing solution as when the film cartridge is unwound with its wrappings and immersed in the developing solution, as occurs in the so-called process of "tank development".

In illustrating my invention I have shown a perspective view of a film cartridge, one end of the film with its wrappings being partly unwound from the spool, and the thickness of the respective parts being somewhat exaggerated. The film proper comprises the flexible transparent support A carrying the photographically sensitized surface and is shown as attached at one end, as indicated by *a*, to a strip or sheet of backing paper B which, it will be understood, is translucent. Underlying the backing B is the sheet C having a coating *c* applied to its outer surface and composed of a waxy material having the characteristics of adhering lightly to the surface of the paper, and capable of being easily removed or at least rendered light permeable by pressure against it as when a stylus is employed for making an inscription upon the outer surface of the backing B. The coating *c* is formed of a composition of waxy material, a suitable dye for coloring it, a pigment, such as lamp black, for rendering the mixture substantially opaque, a mineral oil, or other non-drying oil, for adding to the mixture those properties which cause it to adhere to the surface of the paper, and to become readily displaced and give clear and sharp lines when pressure is applied thereto, so that the lines inscribed by the stylus will be translucent, thereby permitting the actinic light rays to pass through the sheet and reproduce the markings thereon in the sensitized coating on the film or support A.

While it is preferred that the coating shall be opaque it need be only of sufficient density to prevent the passage of light in connection with the outer covering paper B which latter could be colored if desired. The sheet C is preferably composed of tissue paper and the coating is only applied to one surface thereof. Consequently, the fibers of the paper on one surface of the web, being uncoated, are free to absorb moisture, and if this is present in any considerable quantities the stencil sheet will have a tendency to adhere to the back of the photographic film when damp. This is especially true when the roll, or cartridge, is treated to the so-called "tank development" process, in which the film and its overlying coverings are unwound from the spool and submerged as a whole in the developing solution.

In order to obviate the above mentioned difficulties I have placed between the film A and the stencil sheet C a sheet, or strip, of translucent waterproof paper D which may be non-absorbent chemically prepared stock paper, such as glassine paper, although I may use a web of tissue paper which is rendered non-absorbent by a coating of transparent wax, or paraffin, as such a coating tends to make the web more translucent. Such a coating may be applied by means of any of the well known coating machines, either by means of an application roller dipping in the heated fluid and revolving in contact with the web, or by passing the latter through the wax bath.

The interleaved waterproof sheet D will assist the stencil sheet to produce the best results if it is of a hard and dense tissue web as compared with one in which the fibers are not compact, as the latter will act to a certain extent as a cushion and tend to interfere with the clear and sharp removal of the coating under the action of the stylus.

I claim as my invention:

1. In a photographic film cartridge, the combination with a strip of flexible sensitized material and a strip of stencil material having a relatively opaque coating rendered light permeable by pressure when written against by means of a stylus, of a strip of waterproof material interposed between the sensitized and stencil materials, the whole being wound together for insertion in a camera or holder.

2. In a photographic film cartridge, the combination with a strip of flexible sensitized film and a sheet forming a backing for the film having a relatively opaque coating adapted to be rendered light permeable by pressure when written against by a stylus, and a strip of translucent non-absorbent material interleaved between the film and sheet, the whole being wound together.

3. A photographic film cartridge comprising a strip of flexible film having a sensitized surface, an absorbent sheet in rear of the film having a coating relatively opaque but rendered light permeable by pressure, a strip of non-absorbent material between the film and stencil sheet and a backing sheet overlying the latter.

4. In a photographic film cartridge, the combination with a strip of flexible transparent film photographically sensitized, a translucent backing to which the film is attached at one end and a sheet interposed between said parts having an opaque coating adapted to be rendered light permeable by the pressure exerted by a stylus, of a strip of translucent waterproof paper positioned between the film and sheet.

ALBERT F. SULZER.

Witnesses:
RUSSELL B. GRIFFITH,
AGNES NESBITT BISSELL.

Copies of this patent may be obtained for five cents each, by addressing the "Commissioner of Patents, Washington, D. C."